(12) United States Patent
Nanri et al.

(10) Patent No.: US 6,343,470 B1
(45) Date of Patent: Feb. 5, 2002

(54) CONTROL METHOD FOR HYDROSTATIC TYPE CONTINUOUSLY VARIABLE TRANSMISSION

(75) Inventors: Takehiko Nanri; Yoshihiro Kimura; Nobuyuki Yakigaya; Yoshihiro Yoshida, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,425

(22) Filed: Sep. 5, 2000

(30) Foreign Application Priority Data

Sep. 5, 1999 (JP) ............................................ 11-291418

(51) Int. Cl.[7] ............................................... F16D 31/02
(52) U.S. Cl. ........................................ 60/448; 60/483
(58) Field of Search ......................... 60/487, 490, 448, 60/445

(56) References Cited

FOREIGN PATENT DOCUMENTS

| JP | 2527199 | 6/1996 |

*Primary Examiner*—Edward K. Look
*Assistant Examiner*—Igor Kershteyn
(74) *Attorney, Agent, or Firm*—Birch, Stewart, Kolasch & Birch, LLP

(57) ABSTRACT

An overtop position is to be established in a hydrostatic type continuously variable transmission, and an increase of the maximum speed and the maintenance of power performance are to be made compatible with each other. In a hydrostatic type continuously variable transmission, the angle of inclination of a movable swash plate is controlled in such a manner that a target Ne is calculated from both RC (riding condition) and throttle valve opening, then the target Ne thus calculated is compared with an actual Ne to determine a rotational direction and DUTY of a control motor. The operation of the control motor is controlled in accordance with the thus-determined data and angle information on the angle of the movable swash plate provided from an angle sensor. In constant speed vehicular traveling, the change gear ratio is set at TOP ratio and a shift is made to OVERTOP when predetermined overtop control conditions ((1) the current change gear ratio should be at TOP position, (2) the degree opening of a throttle valve should exceed a threshold value determined according to a vehicular speed, and (3) the engine speed should exceed a preset value) are satisfied, thereby increasing the maximum vehicle speed.

19 Claims, 5 Drawing Sheets

CONTROL METHOD FOR HYDROSTATIC TYPE CONTINUOUSLY VARIABLE TRANSMISSION

BACKGROUND OF THE INVENTION

1. Field of the Invention

The present invention relates to a control method for a movable swash plate in an automatic transmission mounted on a vehicle, especially a hydrostatic type continuously variable transmission wherein a swash plate type hydraulic pump of a fixed displacement and a swash plate type hydraulic motor of a variable displacement are connected together through a hydraulic closed circuit.

2. Description of Related Art

A hydrostatic type continuously variable transmission is known and is applied to transmissions of various vehicles, including two-wheeled motor vehicles. A control method for such a hydrostatic type continuously variable transmission is disclosed in Japanese Patent No. 2527199, in which an actual Ne (number of revolutions, also in the following) based on the Ne of a crank shaft for example is compared by a controller with a target Ne which is determined on the basis of preset conditions. Furthermore, the angle of inclination of a movable swash plate is adjusted to control the output.

As shown in FIG. 6 of the above-identified reference, in a continuously variable transmission, LOW and TOP positions in a change gear ratio are usually detected and the angle of inclination of a movable swash plate is usually controlled in the detected range.

According to the above related art control method, the change gear ratio in a hydrostatic type continuously variable transmission varies only in a predetermined range and the ordinary change gear ratio of TOP is 1.0. If the ratio is made smaller (OVERTOP), a lowering of efficiency will result. On the other hand, since a vehicular maximum speed depends on both the TOP ratio and the engine speed, a vehicle which is incapable of taking a large maximum value of engine speed becomes much lower in maximum speed. If the TOP ratio in a constant-speed vehicular traveling is set small in an effort to increase the maximum speed, the power performance will be deteriorated accordingly. Therefore, it is an object of the present invention to permit vehicular overtop traveling while suppressing the deterioration of power performance as far as possible in a continuously variable transmission.

SUMMARY OF THE INVENTION

According to the present invention, in order to solve the above-mentioned problems, there is provided a control method in a hydrostatic type continuously variable transmission, wherein a target engine speed of a target change gear ratio is determined on the basis of the degree of opening of a throttle valve and engine speed, and the change gear ratio of the continuously variable transmission is controlled on the basis of the determined value, characterized in that vehicular overtop traveling is allowed only when predetermined conditions are satisfied.

According to the present invention, in a control method for a hydrostatic type continuously variable transmission, since the change gear ratio of overtop is allowed only when predetermined conditions are satisfied, a constant speed traveling other than the overtop traveling does not deteriorate the power performance by setting the ratio at TOP. Besides, only under limited conditions, the maximum speed can be increased by overtop traveling. Thus, only when constant speed traveling is required which does not cause deterioration of power performance, it is possible to make the maintenance of power performance and the overtop traveling compatible with each other.

Furthermore, by setting the "predetermined conditions" referred to above as follows:

(1) The current change gear ratio should be at TOP position;
(2) The degree of opening of a throttle valve should exceed a threshold value determined according to a vehicle speed; and
(3) The engine speed should exceed a preset value, the conditions in question can be set strictly in only a vehicular traveling scene which really requires overtop permitting conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
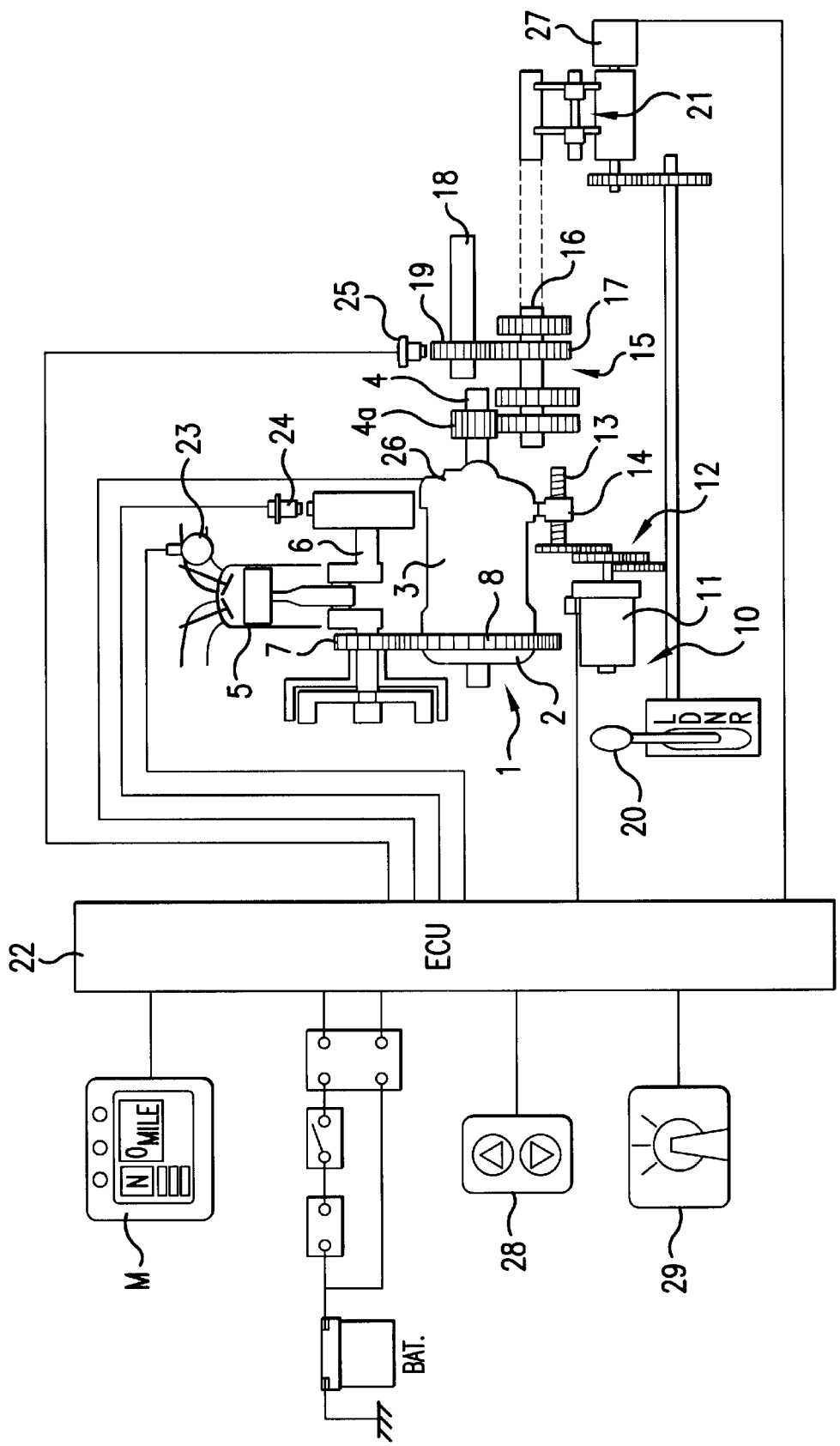
FIG. 1 is a control system diagram in an entire hydrostatic type continuously variable transmission according to an embodiment of the present invention.
Figure 2:
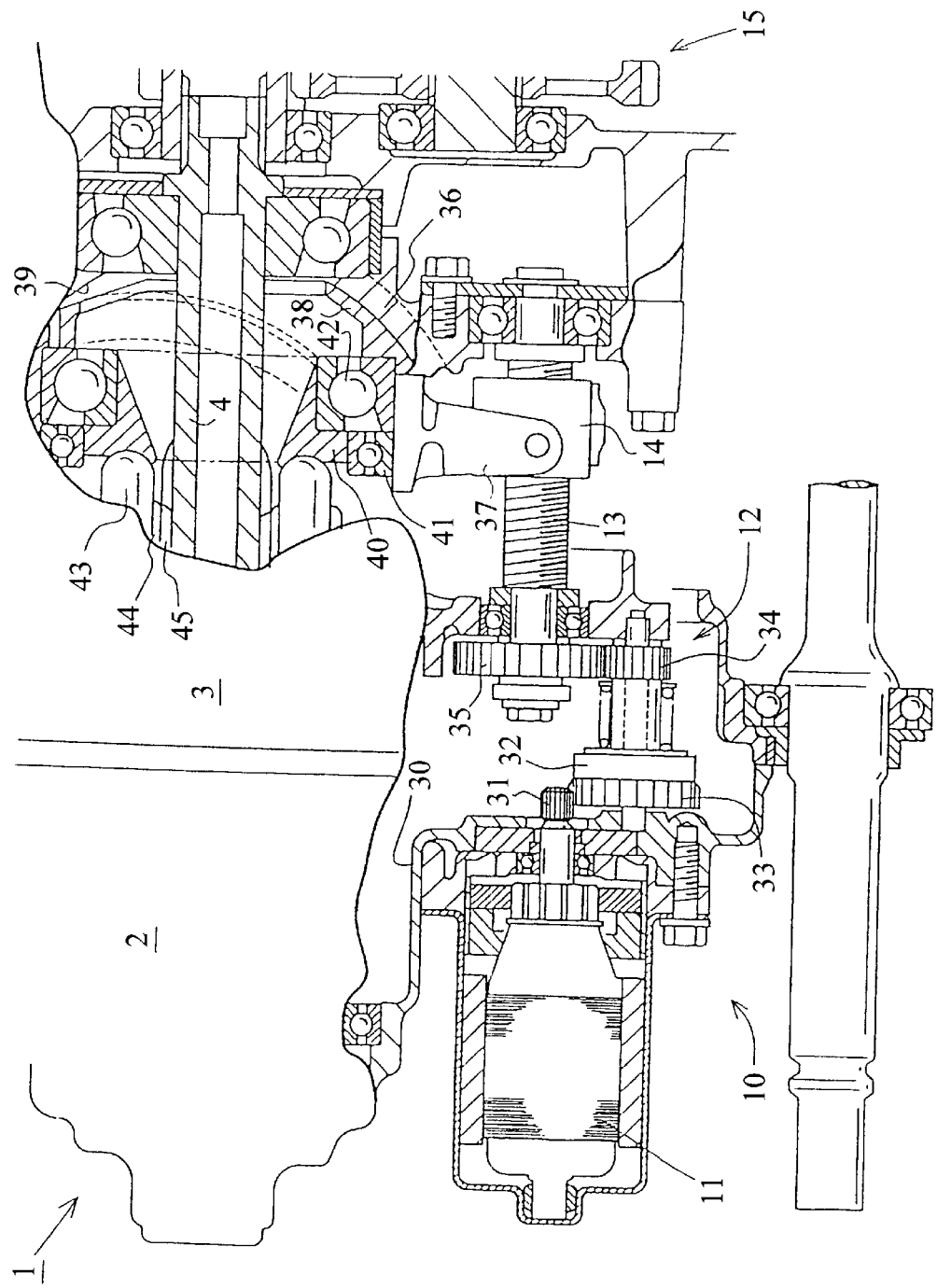
FIG. 2 illustrates an inclination angle control mechanism.
Figure 3:
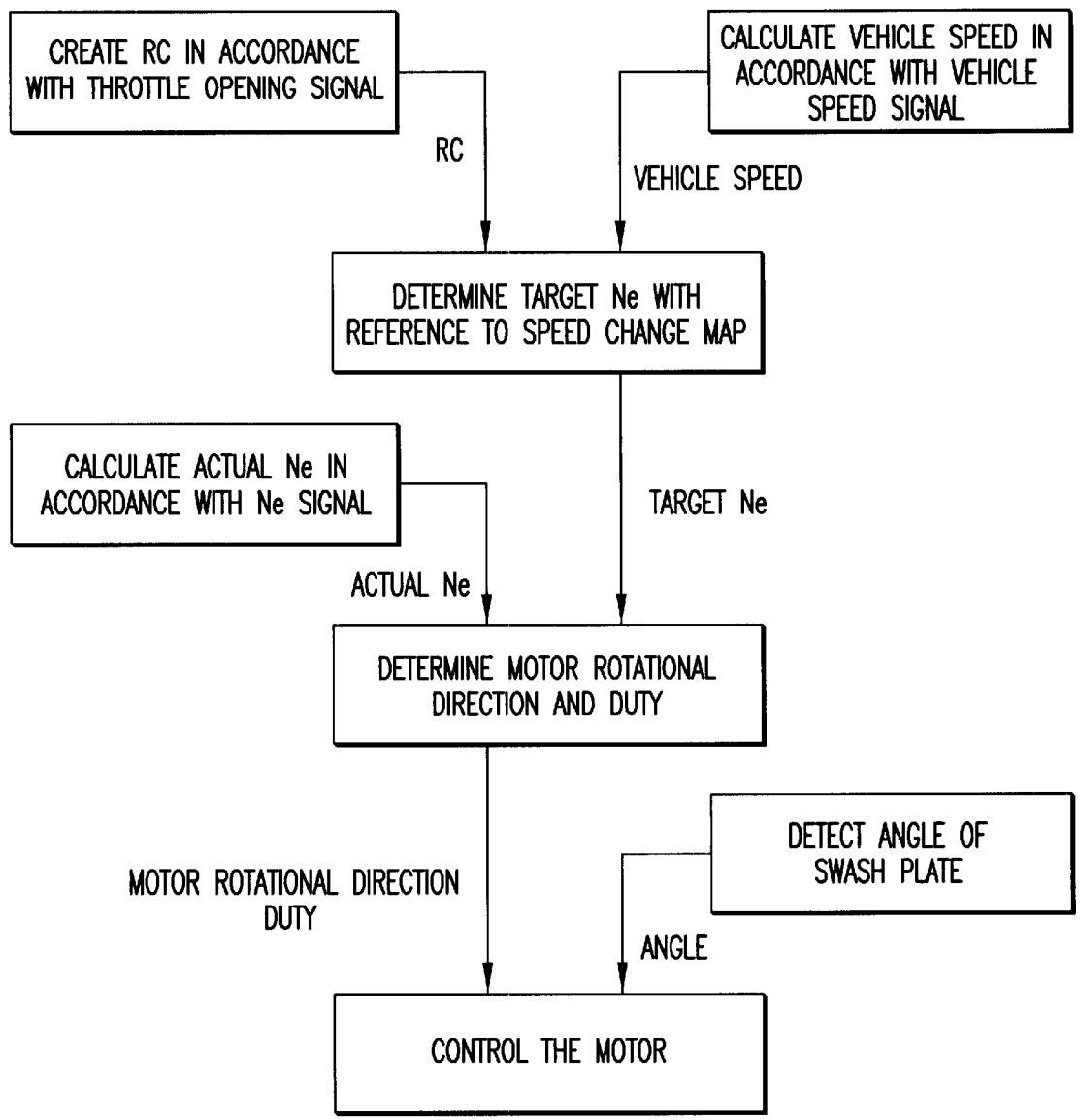
FIG. 3 is a flow chart of an inclination angle control made in the embodiment of the present invention.
Figure 4:
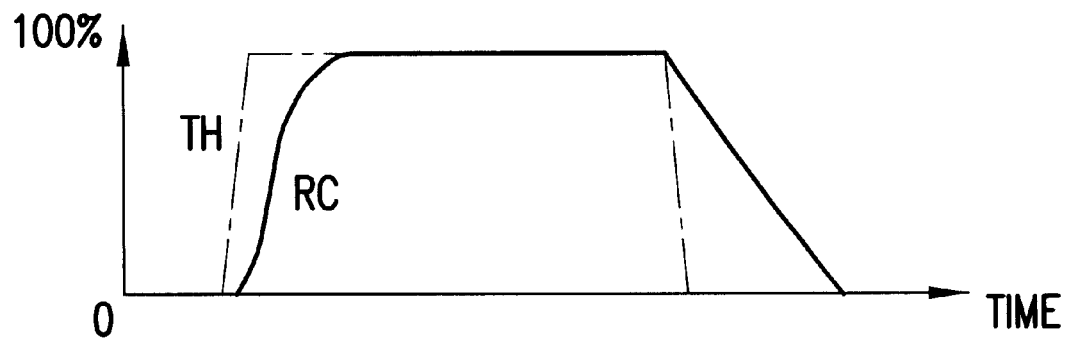
FIG. 4 illustrates how to determine RC.
Figure 5:
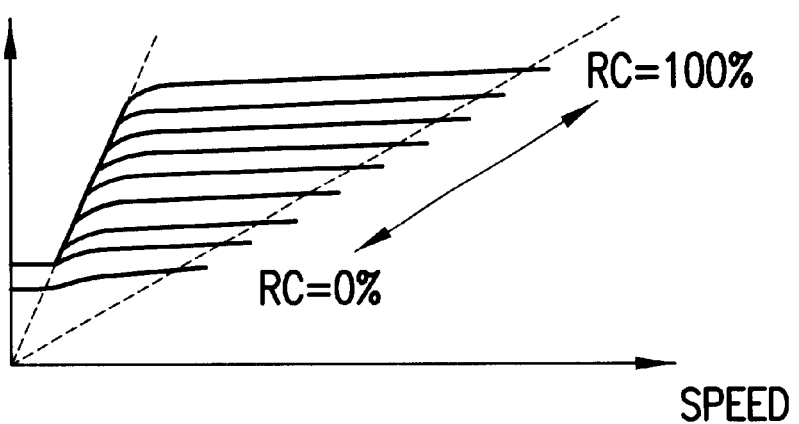
FIG. 5 illustrates a speed change map.
Figure 6:
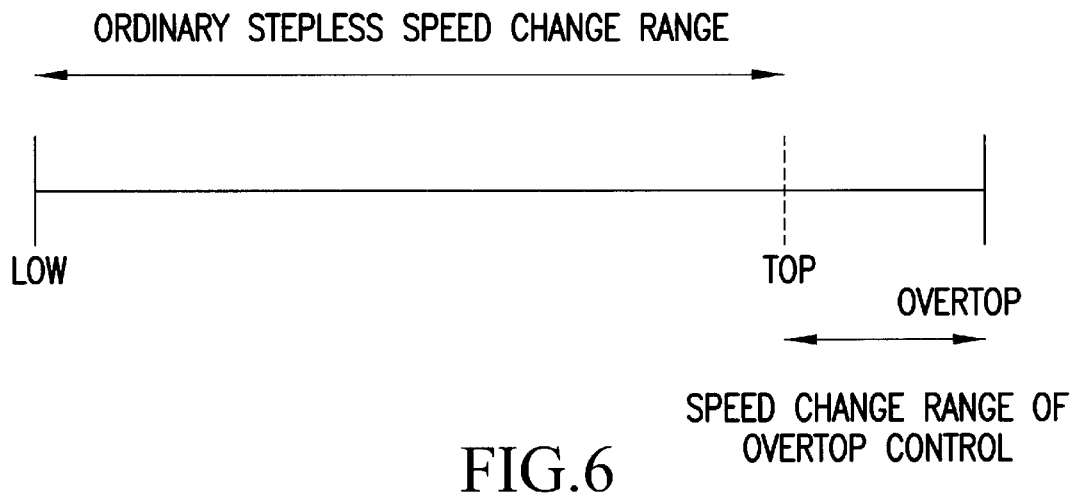
FIG. 6 illustrates a speed change control range.
Figure 7:
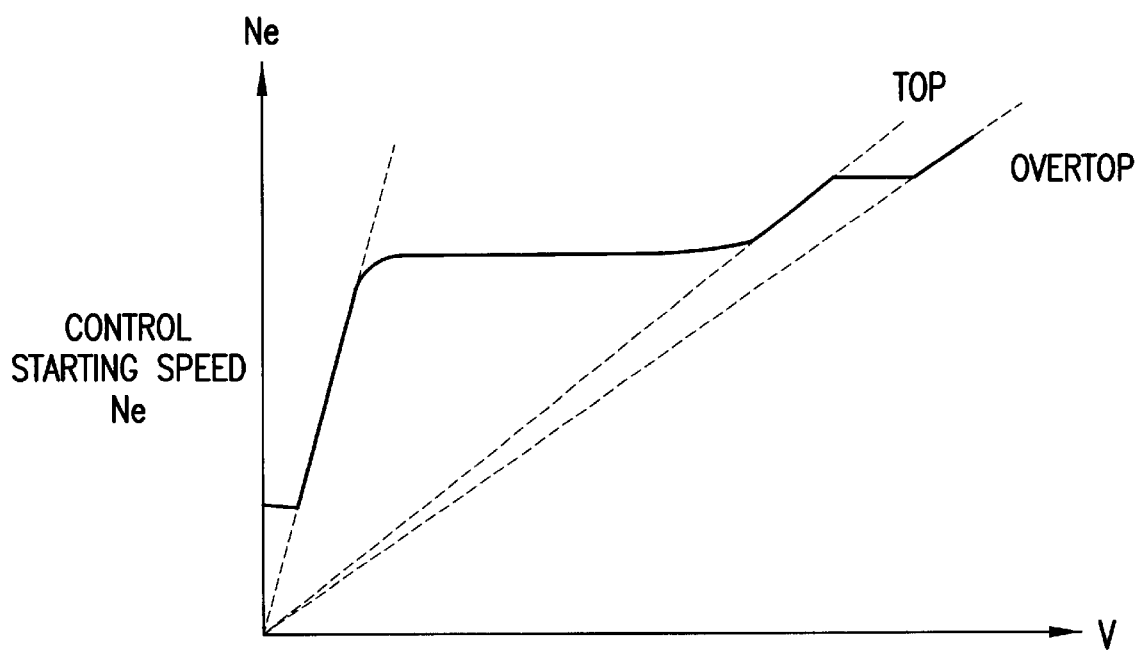
FIG. 7 illustrates a speed change condition.

An embodiment of the present invention will be described below with reference to the drawings, in which FIG. 1 illustrates a control system according to an embodiment of the present invention, FIG. 2 illustrates an inclination angle control mechanism portion of a movable swash plate, FIG. 3 is a flow chart of inclination angle control, FIG. 4 illustrates how to determine RC (riding condition), FIG. 5 is a speed change map, FIG. 6 is a conceptual diagram of a speed change range, and FIG. 7 is a conceptual diagram of overtop control.

First, with reference to FIG. 1, an explanation will be provided regarding how to control a hydrostatic type continuously variable transmission. In the hydrostatic type continuously variable transmission, indicated at 1, a hydraulic pump 2 of a fixed displacement and a hydraulic motor 3 of a variable displacement are made integral and connected with each other through a hydraulic closed circuit on a driving shaft 4. A driven gear 8 of the hydraulic pump 2 is rotated by a driving gear 7 mounted on a crank shaft 6 of an engine 5, and the resulting rotational force is output to the driving shaft 4. At this time, the angle of inclination of a movable swash plate, to be described later, which is incorporated in the hydraulic motor 3, is varied by an inclination angle control mechanism 10, whereby the change gear ratio can be changed.

The inclination angle control mechanism 10 transmits the output of a control motor 11 to a reduction gear 12 to change, through a ball screw 13 and a slider 14, the inclination angle of the movable swash plate incorporated in the hydraulic motor 3. A speed change output of the hydrostatic type continuously variable transmission 1 is transmitted from an output gear 4a on the driving shaft 4 to a secondary reduction mechanism 15. The speed change output of the secondary reduction mechanism 15 is transmitted from an output gear 17 on a speed change output shaft 16 to a final output gear 19 on a final output shaft 18.

In the secondary reduction mechanism 15, by manually operating a shift lever 20 to actuate a shifter 21, a change-over is made among shift positions, including forward L or D, reverse R, and neutral N. As to the forward side, a stepless speed change is conducted for each of L and D shift positions by the foregoing inclination angle control.

The inclination angle control is performed by controlling the operation of the control motor 11 in the inclination angle control mechanism 10 with use of a controller 22. The controller 22 involves signals for the inclination angle control mechanism 10, which signals are a throttle opening signal provided from a throttle sensor 23 disposed at the intake side of the engine 5, an Ne signal provided from a revolution sensor 24 disposed in proximity to the crank shaft 6, a vehicle speed signal provided from a speed sensor 25 disposed in proximity to the final output gear 19, a swash plate angle signal provided from an angle sensor 26 attached to the hydraulic motor 3, and a shift position signal provided from a shift sensor 27 attached to the shifter 21.

The controller 22 also acquires signals from a shift switch 28 and a mode map switch 29 both mounted on a handlebar of the vehicle. The controller 22 outputs a display signal to be displayed on an indicator of an instrument panel M. The controller is supplied with electric power from a vehicular battery.

The inclination angle control mechanism 10 will now be described with reference to FIG. 2. The control motor 11 in the control mechanism 10 is supported by a housing 30 of the fixed displacement hydraulic pump 2 and an output gear 31 thereof is connected to a ball screw driving gear 35 via an input gear 33 in a torque limiter 32 and a gear 34. The ball screw driving gear 35 is adapted to rotate integrally with the ball screw 13. As the ball screw 13 rotates forward or reverse, the slider 14, which is formed with a nut, moves axially on the ball screw either to the right or to the left in the figure.

The ball screw 13 is supported at both ends thereof by a housing 36 of the hydraulic motor 3.

One end of an arm 37 which projects outward from the housing 36 of the fixed displacement hydraulic motor 3 is connected pivotably to the slider 14, while an opposite end of the arm 37 is integral with a swash plate holder 38 which is supported within the housing 36. The swash plate holder 38 is supported so that it can roll onto a concavely curved surface 39 of the housing 36. Therefore, when the arm 37 turns, the swash plate holder 38 rolls on the concavely curved surface 39 to change its angle.

A movable swash plate 40 is rotatably held inside the swash plate holder 38 through bearings 41 and 42. As the angle of the swash plate holder 38 changes, a rotational surface of the movable swash plate 40 changes the inclination angle relative to the axis of the driving shaft 4. The illustrated state is at 90°, indicating a TOP condition with the change gear ratio being 1.0.

A hydraulic plunger 43 of the hydraulic motor 3 is pushed against the movable swash plate 40. The hydraulic plunger 43 is provided in a plural number circumferentially of a drum-like rotary member 44. With the hydraulic pressure on the hydraulic pump 2 side, the hydraulic plungers 43 project to the movable swash plate 40 side and are pushed against the swash plate, with a rotational force being imparted to the rotary member 44 in accordance with the angle of inclination of the movable swash plate 40. An outer peripheral portion of the rotary member 44 is splined at 45 to the driving shaft 4, so that the driving shaft 4 is rotated by rotation of the rotary member 44.

Now, with reference to FIG. 3, the following description is provided about the control by the controller 22 at the time of stepless speed change. First, an RC (riding condition) is created in accordance with a throttle opening signal provided from the throttle sensor 23. The RC stands for a value which increases or decreases relative to the value of the throttle opening signal and there basically exists the following relationship:

1) Opening the throttle valve→RC increases; and

2) Closing the throttle valve→RC decreases.

This relationship is as shown in FIG. 4, in which TH denotes a throttle opening (%), the axis of ordinate represents both throttle opening (%) and RC (%), and the axis of abscissa represents time. Separately, a vehicle speed is calculated in accordance with a vehicle speed signal provided from the angle sensor 26.

Subsequently, a target Ne is determined on the basis of the RC and vehicle speed and with reference to a pre-stored speed change map, an example of which is shown in FIG. 5. Several such maps are prepared in advance, including various modes, e.g., L range mode only, sports mode only, and utility mode only. These modes can be selected with the mode map switch 29.

Furthermore, an actual Ne is calculated in accordance with an Ne signal provided from the revolution sensor 24, then the actual Ne and the foregoing target Ne are compared with each other and either the forward or reverse rotation of the control motor 11, as well as DUTY, are determined.

More specifically, the following decisions are made in terms of directions of the movable swash plate:

1) Actual Ne>Target Ne→Move the movable swash plate to TOP side; and

2) Actual Ne<Target Ne→Move the movable swash plate to LOW side.

As to DUTY, it is determined by the following equation:

$$DUTY = K1 \times |\text{Actual Ne} - \text{Target Ne}|$$

(K1 is a coefficient)

DUTY stands for the ratio of an electric current flowing in the control motor 11, which ratio is used for controlling the speed of the control motor 11. At a DUTY of 100% the speed of the control motor 11 becomes the highest, while at a DUTY of 0% the control motor turns OFF.

Thereafter, the control motor 11 is controlled in accordance with the rotational direction of the motor, DUTY, and the angle of the movable swash plate which has been calculated on the basis of an angle signal provided from the angle sensor 26. More specifically, the control motor 11 is driven in accordance with the motor rotational direction and DUTY and each of LOW and TOP ratios is measured from the angle of the movable swash plate. When the measured value deviates from the TOP ratio, the control motor 11 is turned OFF.

In connection with the inclination angle control, the following description is provided about overtop control. As shown in FIG. 6, the overtop control involves control in a speed change region exceeding the TOP ratio. As shown in FIG. 7, when predetermined conditions (overtop control conditions) are met, the overtop control is performed in the controller 22, which conditions cover all of the following:

(1) The current change gear ratio should be at TOP position;

(2) The degree of opening of the throttle valve should exceed a threshold value determined according to a vehicle speed; and (3) The engine speed should exceed a preset value.

When the above overtop conditions are met, the overtop control is started. In constant speed vehicular traveling, the hydrostatic type continuously variable transmission 1 is set at TOP ratio (90° of the movable swash plate 40 of the transmission 1 relative to the driving shaft 4) to prevent the deterioration of power performance. In this state, only when conditions for increasing the maximum vehicle speed are established on the basis of information pieces provided from vehicular sensors, a control is made so that the change gear ratio of TOP in the transmission 1 shifts in the overtop direction (toward an angle of below 90° relative to the driving shaft 4 of the movable swash plate 40) at a constant speed.

By so doing, the vehicular driving condition, becomes the overtop condition and thus it is possible to increase the maximum speed. In this way, an increase of the maximum vehicle speed, which is limited to the case where limited overtop conditions are met, and a satisfactory power performance in a constant speed vehicular traveling can be made compatible with each other. Besides, by making control so as to effect the shift to the overtop condition at a constant speed, it is possible to diminish the shift shock. Moreover, there is little change of cost because the addition of a new component is not needed for the control in the ordinary hydrostatic type continuously variable transmission.

In making a stepped speed change control in which a stepless speed change control is fixed to an arbitrary ratio with a shift switch or the like, a control may be made in such a manner that the change gear ratio is usually set at TOP ratio of a hydrostatic type continuously variable transmission which is determined with a shift switch. Only when the maximum vehicular speed is to be increased and when information pieces provided from vehicular sensors satisfy predetermined conditions, the TOP ratio of the transmission is shifted in the overtop direction (below 90° as the inclination angle of the movable swash plate 40) at a constant speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control method in a hydrostatic type continuously variable transmission, said method comprising the steps of:

determining a target engine speed or a target change gear ratio on the basis of a degree of opening of a throttle valve and a speed of an engine;

controlling the change gear ratio of the continuously variable transmission on the basis of either the determined target engine speed or the determined target change gear ratio; and allowing vehicular overtop traveling only when predetermined conditions are satisfied.

2. The control method of claim 1, wherein said predetermined conditions include all of the following conditions:

the current change gear ratio should be at TOP position;

the degree of opening of the throttle valve should exceed a threshold value determined according to a speed of the vehicle; and the engine speed should exceed a preset value.

3. The control method of claim 1, wherein said step of controlling the change gear ratio further comprises the step of varying an angle of inclination of a movable swash plate by an inclination control mechanism to change the change gear ratio.

4. The control method of claim 3, wherein said step of varying further comprises the step of controlling the inclination angle control mechanism to transmit output of a control motor to a reduction gear to change, through a ball screw and a slider, the inclination angle of the movable swash plate.

5. The control method of claim 1, wherein said step of determining further comprises the step of referring to a pre-stored speed change map selected from various modes by a mode map switch.

6. The control method of claim 1, wherein said step of determining further comprises the steps of determining the speed of the engine from a revolution sensor and determining the degree of opening of the throttle valve from a throttle sensor.

7. The control method of claim 3, wherein said step of determining further comprises the steps of comparing the target engine speed with the actual engine speed and determining either forward or reverse rotation of a control motor for changing an inclination angle of a movable swash plate.

8. A control for a hydrostatic type continuously variable transmission, said control comprising:

means for determining a target engine speed or a target change gear ratio on the basis of a degree of opening of a throttle valve and a speed of an engine;

means for controlling the change gear ratio of the continuously variable transmission on the basis of either the determined target engine speed or the determined target change gear ratio; and means for allowing vehicular overtop traveling only when predetermined conditions are satisfied.

9. The control of claim 8, wherein said predetermined conditions include all of the following conditions:

the current change gear ratio should be at TOP position;

the degree of opening of the throttle valve should exceed a threshold value determined according to a speed of the vehicle; and the engine speed should exceed a preset value.

10. The control of claim 8, wherein said means for controlling the change gear ratio further comprises:

a movable swash plate for changing the change gear ratio; and an inclination control mechanism for varying an angle of inclination of said movable swash plate.

11. The control of claim 10, further comprising means for controlling the inclination angle control mechanism to transmit output of a control motor to a reduction gear to change, through a ball screw and a slider, the inclination angle of the movable swash plate.

12. The control of claim 8, further comprising:

a revolution sensor for determining the speed of the engine; and a throttle sensor for determining the degree of opening of the throttle valve.

13. The control of claim 10, further comprising means for comparing the target engine speed with the actual engine speed and determining either forward or reverse rotation of a control motor for changing an inclination angle of a movable swash plate.

14. A hydrostatic type continuously variable transmission, comprising:

a hydraulic pump and a hydraulic motor connected with each other through a hydraulic closed circuit on a driving shaft, said hydraulic pump including a driven gear for being rotated by a driving gear mounted on a crank shaft of an engine;

means for determining a target engine speed or a target change gear ratio on the basis of a degree of opening of a throttle valve and a speed of an engine;

means for controlling the change gear ratio of the continuously variable transmission on the basis of either the determined target engine speed or the determined target change gear ratio; and means for allowing vehicular overtop traveling only when predetermined conditions are satisfied.

15. The hydrostatic type continuously variable transmission of claim 14, wherein said predetermined conditions include all of the following conditions:

the current change gear ratio should be at TOP position;

the degree of opening of the throttle valve should exceed a threshold value determined according to a speed of the vehicle; and the engine speed should exceed a preset value.

16. The hydrostatic type continuously variable transmission of claim 14, wherein said means for controlling the change gear ratio further comprises:

a movable swash plate for changing the change gear ratio; and an inclination control mechanism for varying an angle of inclination of said movable swash plate.

17. The hydrostatic type continuously variable transmission of claim 16, further comprising means for controlling the inclination angle control mechanism to transmit output of a control motor to a reduction gear to change, through a ball screw and a slider, the inclination angle of the movable swash plate.

18. The hydrostatic type continuously variable transmission of claim 14, further comprising:

a revolution sensor for determining the speed of the engine; and a throttle sensor for determining the degree of opening of the throttle valve.

19. The hydrostatic type continuously variable transmission of claim 10, further comprising means for comparing the target engine speed with the actual engine speed and determining either forward or reverse rotation of a control motor for changing an inclination angle of a movable swash plate.

* * * * *